US010848094B2

(12) United States Patent
Niimi

(10) Patent No.: US 10,848,094 B2
(45) Date of Patent: *Nov. 24, 2020

(54) SOLAR PANEL FLOAT AND CONNECTED MEMBER THEREOF

(71) Applicant: KYORAKU CO., LTD., Kyoto (JP)

(72) Inventor: Takaya Niimi, Tokyo (JP)

(73) Assignee: KYORAKU CO., LTD., Kyoto-Shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/514,372

(22) Filed: Jul. 17, 2019

(65) Prior Publication Data

US 2019/0341877 A1 Nov. 7, 2019

Related U.S. Application Data

(63) Continuation of application No. 15/311,236, filed as application No. PCT/JP2015/061729 on Apr. 16, 2015, now Pat. No. 10,396,703.

(30) Foreign Application Priority Data

May 16, 2014 (JP) .................................. 2014-102176
May 16, 2014 (JP) .................................. 2014-102178

(51) Int. Cl.
*H02S 10/40* (2014.01)
*B63B 35/44* (2006.01)
*B63B 35/38* (2006.01)

(52) U.S. Cl.
CPC ............. *H02S 10/40* (2014.12); *B63B 35/38* (2013.01); *B63B 35/44* (2013.01); *B63B 2035/4453* (2013.01); *B63B 2209/18* (2013.01)

(58) Field of Classification Search
CPC .......... B63B 35/00; B63B 35/34; B63B 35/44; B63B 21/50; B63B 38/00; B63B 39/03;
(Continued)

(56) References Cited

U.S. PATENT DOCUMENTS 5,215,028 A   6/1993 Hayakawa
10,396,703 B2* 8/2019 Niimi ...................... B63B 35/44
(Continued)

FOREIGN PATENT DOCUMENTS

EP  2549551 A1  1/2013
JP  H05-85466 A  4/1993
(Continued)

OTHER PUBLICATIONS

PCT International Search Report dated Jun. 30, 2015 issued in corresponding PCT International Application No. PCT/JP2015/061729.

*Primary Examiner* — Lars A Olson
(74) *Attorney, Agent, or Firm* — Maier & Maier, PLLC

(57) ABSTRACT

The present invention provides a solar panel float in which an increase in the number of components is prevented and which is easy to assemble. A float for mounting a solar panel is provided with: an annular float portion; a first support portion that supports an edge on one side of the solar panel; and a second support portion that supports an edge on the other side of the solar panel. The first support portion includes a first support plate portion rising from a wall surface on one side of an inner periphery of the annular float portion. The first support plate portion is formed of a cut-and-raised piece that has been cut and raised, from a flat plate portion integrally formed so as to close the inner periphery during molding of the annular float portion, using a lower-side portion of the flat plate portion as a bending-fulcrum point.

6 Claims, 14 Drawing Sheets

(58) Field of Classification Search
CPC ....... H02S 10/40; H01L 31/04; H01L 31/042; H01L 31/0422
USPC .................................................. 114/264, 267
See application file for complete search history.

(56) References Cited

U.S. PATENT DOCUMENTS

2013/0146127 A1  6/2013  Lunoe et al.
2014/0224165 A1  8/2014  Veloso et al.

FOREIGN PATENT DOCUMENTS

| JP | H6-321176 A | 11/1994 |
| JP | 2000-101123 A | 4/2000 |
| JP | 2002281773 A | 9/2002 |
| JP | 2013124449 A | 6/2013 |
| JP | 2014-511043 A | 5/2014 |
| KR | 100909404 B1 | 7/2009 |
| WO | 2011/021620 A1 | 2/2011 |
| WO | 2011/094803 A1 | 8/2011 |

* cited by examiner

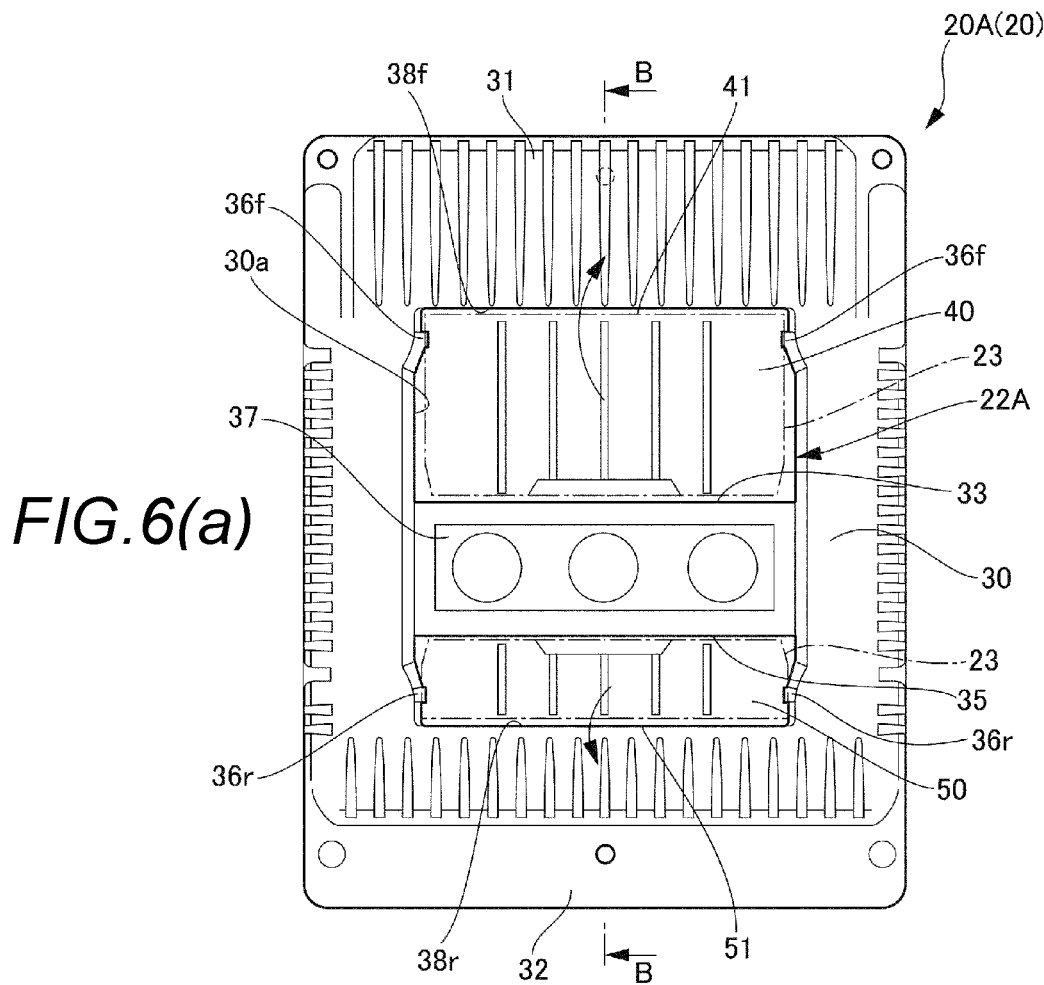
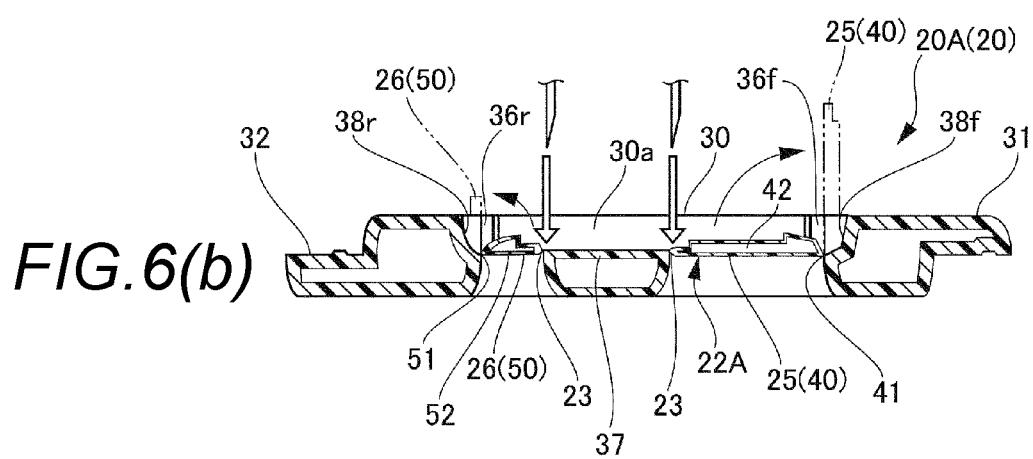
FIG.6(a)
FIG.6(b)

SOLAR PANEL FLOAT AND CONNECTED MEMBER THEREOF

CROSS-REFERENCE TO RELATED APPLICATIONS

This is a continuation of U.S. application Ser. No. 15/311,236 filed on Nov. 15, 2016, which is a U.S. national phase application under 35 U.S.C. § 371 of International Patent Application No. PCT/JP2015/061729, filed on Apr. 16, 2015, and claims benefit of priority to Japanese Patent Application Nos. 2014-102176, filed May 16, 2014 and 2014-102178, filed May 16, 2014. The entire contents of these applications are hereby incorporated by reference.

TECHNICAL FIELD

The present invention relates to a solar panel float and a solar panel float connected member.

BACKGROUND

For solar power generation by which sunlight is converted into electric power, solar panels (which may also be referred to as solar battery panels or solar battery modules) are used. Solar panels have been mostly installed on the roofs or wall surfaces of buildings, or on the ground, for example. However, recent years have seen attempts to install the solar panels on the water, such as on the surface of idled ponds or lakes.

The water-floating solar panel requires a float to keep the solar panel afloat. The float may preferably be a hollow molded body made of lightweight and highly durable synthetic resin (for example, a molded body manufactured by blow molding). Conventionally, as a hollow molded body that floats on the water, a float described in Korean Patent No. 10-0909404 is known.

FIG. 17 is a diagram illustrating the basic configuration of the float according to Korean Patent No. 10-0909404. The float 100 is provided with a synthetic resin body 101 that has an internal space portion. The body 101 is molded into a hollow cube by blow molding. On four corners of the body 101, connector portions 102 are formed so as to protrude outward. The connector portions 102 have through holes 103 formed therein. When a plurality of floats 100 are connected, the connector portions 102 and the through holes 103 of the floats 100 are vertically overlapped with each other. Into the multiple through holes 103, pins 105 are inserted from above, whereby the plurality of connector portions 102 are connected.

Generally, it is difficult to integrally form complex structures for supporting the solar panel by a hollow molding method, such as blow molding. Accordingly, when the float 100 according to Korean Patent No. 10-0909404 is to be utilized as a solar panel float, for example, it is necessary to mount components that have been separately manufactured from the body 101 to support the solar panel. As a result, the number of components increases, leading to an increase in component cost. In addition, because of the increase in the number of components, assembly workability is low.

When the float 100 according to Korean Patent No. 10-0909404 is to be utilized as a solar panel float, a ship or the like will be required at the time of installing or checking the float. Accordingly, the installation or checking becomes extremely difficult. In addition, the installation or checking, which is performed aboard the float 100, involves the problem of having to increase the size of the float 100 with respect to the solar panel beyond a required size.

SUMMARY

The present invention has been made in view of the above circumstances. An object of the present invention is to provide a solar panel float which, by a configuration utilizing a portion integrally formed in a hollow molded body and being capable of supporting a solar panel, can prevent an increase in the number of components, and which is easy to assemble.

The present invention has been made in view of the above circumstances. An object of the present invention is to provide a solar panel float connected member which enables easy installation and checking when floats with solar panels mounted thereon are mutually connected adjacent to each other, despite that the floats have an efficient size with respect to the solar panels.

The present invention is understood as follows.

(1) A solar panel mounting float according to a first aspect of the present invention includes: a hollow-molded annular float portion made of synthetic resin; a first support portion supporting an edge on one side of the solar panel; and a second support portion supporting an edge on another side of the solar panel. The first support portion includes a first support plate portion rising from a wall surface on one side of an inner periphery of the annular float portion. The first support plate portion is formed by a cut-and-raised piece cut and raised, from a flat plate portion integrally formed so as to close the inner periphery during molding of the annular float portion, using a lower-side portion of the flat plate portion as a bending-fulcrum point.

(2) In the solar panel float according to (1), the first support portion may have a height greater than a height of the second support portion so as to enable the solar panel to be supported with an inclination with respect to the annular float portion.

(3) In the solar panel float according to (1) or (2), the second support portion may include a second support plate portion rising from a wall surface on another side of the inner periphery of the annular float portion. The second support plate portion may be formed by a cut-and-raised piece cut and raised, from a flat plate portion integrally formed so as to close the inner periphery during molding of the annular float portion, using a lower-side portion of the flat plate portion as a bending-fulcrum point.

(4) In the solar panel float according to any one of (1) to (3), the annular float portion may include, on the inner periphery, an engaging portion for retaining an upright state of the first support plate portion by engaging a lateral-side portion of the first support plate portion.

(5) In the solar panel float according to (3) or (4), the annular float portion may include, on the inner periphery, an engaging portion for retaining an upright state of the second support plate portion by engaging a lateral-side portion of the second support plate portion.

(6) The solar panel float according to any one of (1) to (5), further includes a first mounting member interposed between an upper portion of the first support plate portion and the edge on one side of the solar panel, and configured to enable mounting of the edge on one side of the solar panel. The first mounting member may have a greater width than a width of the upper portion of the first support plate portion.

(7) The solar panel float according to (6), the first mounting member may include a fitting groove portion configured to fit the edge on one side of the solar panel.

(8) The solar panel float according to any one of (3) to (7), further includes a second mounting member interposed between an upper portion of the second support plate portion and the edge on the other side of the solar panel, and configured to enable mounting of the edge on the other side of the solar panel. The second mounting member may have a greater width than a width of the upper portion of the second support plate portion.

(9) In the solar panel float according to (8), the second mounting member may include a fitting groove portion configured to fit the edge on the other side of the solar panel.

(10) In the solar panel float according to (1) or (2), the second support portion may be formed by a groove formed in the annular float portion and engaging the edge on the other side of the solar panel.

(11) In the solar panel float according to (1) or (2), the second support portion may be formed by a step portion formed in the annular float portion and engaging the edge on the other side of the solar panel.

(12) A solar panel float connected member according to a second aspect of the present invention includes: a plurality of the solar panels floats according to any one of (1) to (11); and a rectangular solar panel mounted on each of the floats and having long sides and short sides. The solar panels are disposed adjacent to each other via the short sides thereof and adjacent to each other having a gap via the long sides thereof. The gap of the solar panels on the floats is formed as a passageway portion.

(13) In the solar panel float connected member according to (12), the passageway portion may be formed as a protrusion extending beyond at least one of the long sides of the solar panels of the floats.

(14) In the solar panel float connected member according to (12) or (13), the floats may be connected to other floats on the short sides of the solar panel via a connector member over the passageway portion.

(15) In the solar panel float connected member according to (14), the connector member may include a hollow portion.

(16) In the solar panel float connected member according to (14) or (15), the connector member may have a thickness such that at least a part of the connector member is submerged when the float is floated on the water.

According to the present invention, the solar panel can be supported using the support plate portion formed integrally with the annular float portion. Accordingly, an increase in the number of components can be prevented, whereby an easy-to-assemble solar panel float can be provided.

The solar panel float connected member configured as described above makes it possible to perform installation or checking easily when the floats with the solar panels mounted thereon are mutually connected adjacent to each other, despite that the floats have an efficient size with respect to the solar panels.

BRIEF DESCRIPTION OF THE DRAWINGS

FIGS. 6(*a*)-6(*b*) show a diagram illustrating a method for assembling first and second support plate portions according to the first example. FIG. 6(*a*) shows a plan view of a hollow molded body, and FIG. 6(*b*) shows a cross sectional view taken along line B-B of FIG. 6(*a*) and illustrating a method for cutting and raising the first and second support plate portions.

FIG. 13(*a*) shows a plan view, FIG. 13(*b*) shows a cross sectional view along line b-b of FIG. 13(*a*), and FIG. 13(*c*) shows an enlarged view in a circular frame of FIG. 13(*b*).

DETAILED DESCRIPTION

In the following, modes (hereafter referred to as "examples") of carrying out the present invention will be described with reference to the attached drawings. Throughout the description of the examples, similar elements are denoted with similar numerals. In the examples and drawing figures, "front" indicates the "depth" direction when an inclined solar panel is viewed from the front in a horizontal direction; "rear" indicates the "forward" direction; and "left" and "right" indicates the directions of "left" and the "right", when the inclined solar panel is viewed from the front side in a horizontal direction.

FIRST EXAMPLE (Overall Configuration of Solar Panel Float 10)

An overall configuration of a solar panel float 10 will be described with reference to FIG. 1 and FIG. 2.

Figure 1:
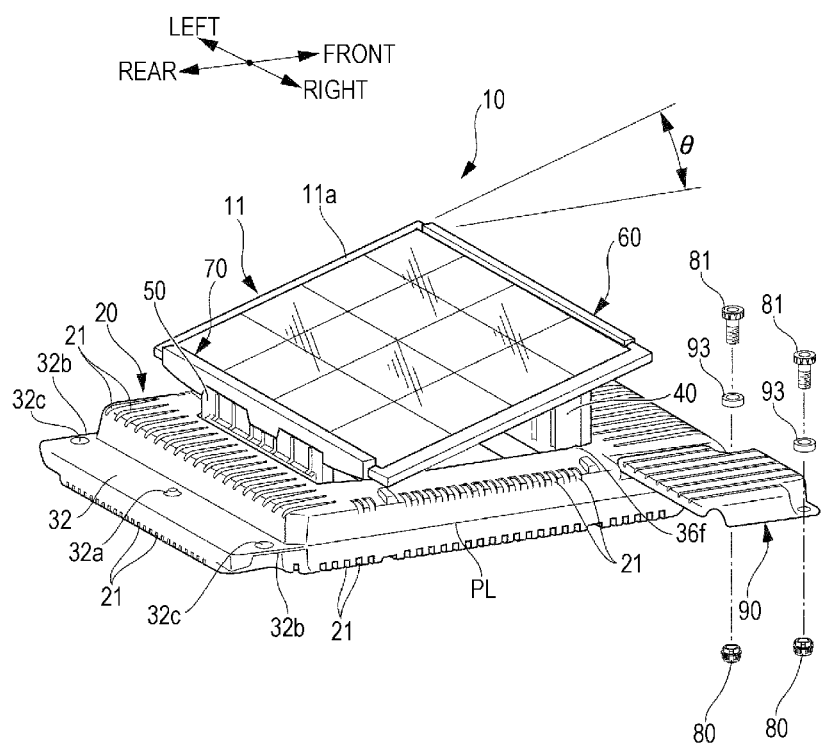
FIG. 1 is a perspective view of a solar panel float according to the first example of the present invention.

As illustrated in FIG. 1, the solar panel float 10 according to the first example is a float for installing a substantially quadrangular (or, in the present example, substantially square) solar panel 11 on water, such as a pond or a lake. With the solar panel float 10, the solar panel 11 is installed on the water so as to be inclined with respect to the horizontal direction. An inclination angle θ of the solar panel 11 is set to an angle most suitable for power generation, depending on the area and the like.

Figure 2:
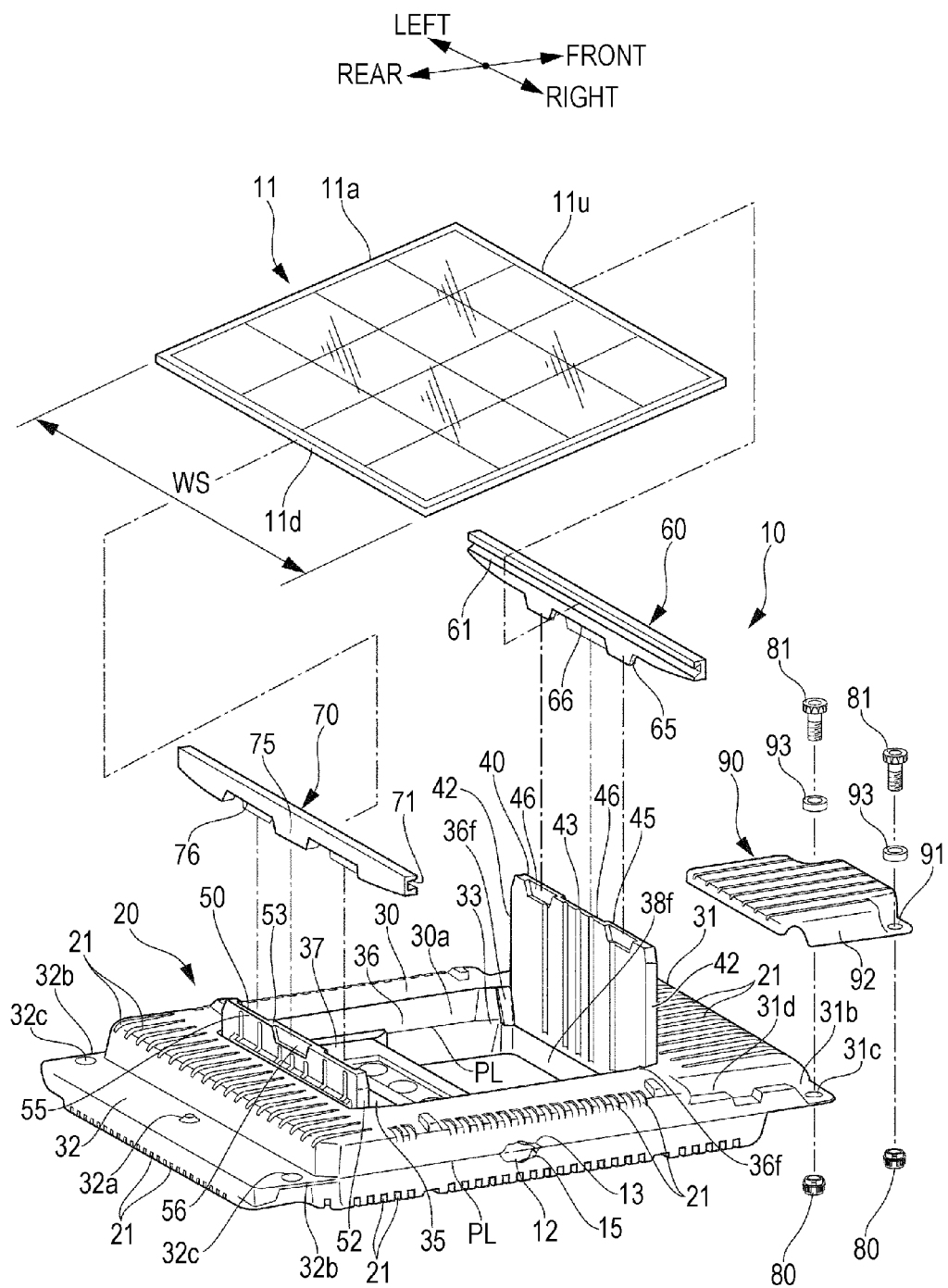
FIG. 2 is an exploded perspective view of the solar panel float.

As illustrated in FIG. 2, the solar panel float 10 is provided with a synthetic-resin float body 20 molded in a hollow shape. The float body 20 is manufactured by, for example, blow molding whereby a molten tubular parison sandwiched between a plurality of split mold blocks is expanded. For the molding material, various synthetic resins can be used. Examples of the synthetic resin that can be used include polyolefin-based resins, such as polyethylene and polypropylene.

The float body 20 has a layer structure which includes an upper wall 13 and a lower wall 15 opposing each other via a hollow portion 12. The upper wall 13 and the lower wall 15 are welded at a parting line PL. Thus, the hollow portion 12 provides a closed space.

The manufacturing of the float body 20 is not particularly limited to blow molding. For example, instead of the tubular parison, hermetic spaces between two molten sheets disposed between the pair of split mold blocks and the split mold blocks may be suctioned. In this way, a float body including a hollow portion between the two sheets can be manufactured. In the case of such molding method, a foamed material and the like can be easily placed between the two sheets as a core material. Accordingly, a float body with higher rigidity can be obtained.

The float body 20 is provided with an annular float portion 30, a first support portion including a first support plate portion 40, and a second support portion including a second support plate portion 50. The first support plate portion 40 is formed inside the annular float portion 30 to support the solar panel 11, and has a substantially quadrangular shape (in the present example, a substantially rectangular shape longer in the right-left direction). The solar panel float 10 is further provided with a first mounting member 60 and a second mounting member 70 to which the solar panel 11 can be mounted.

Figure 3:
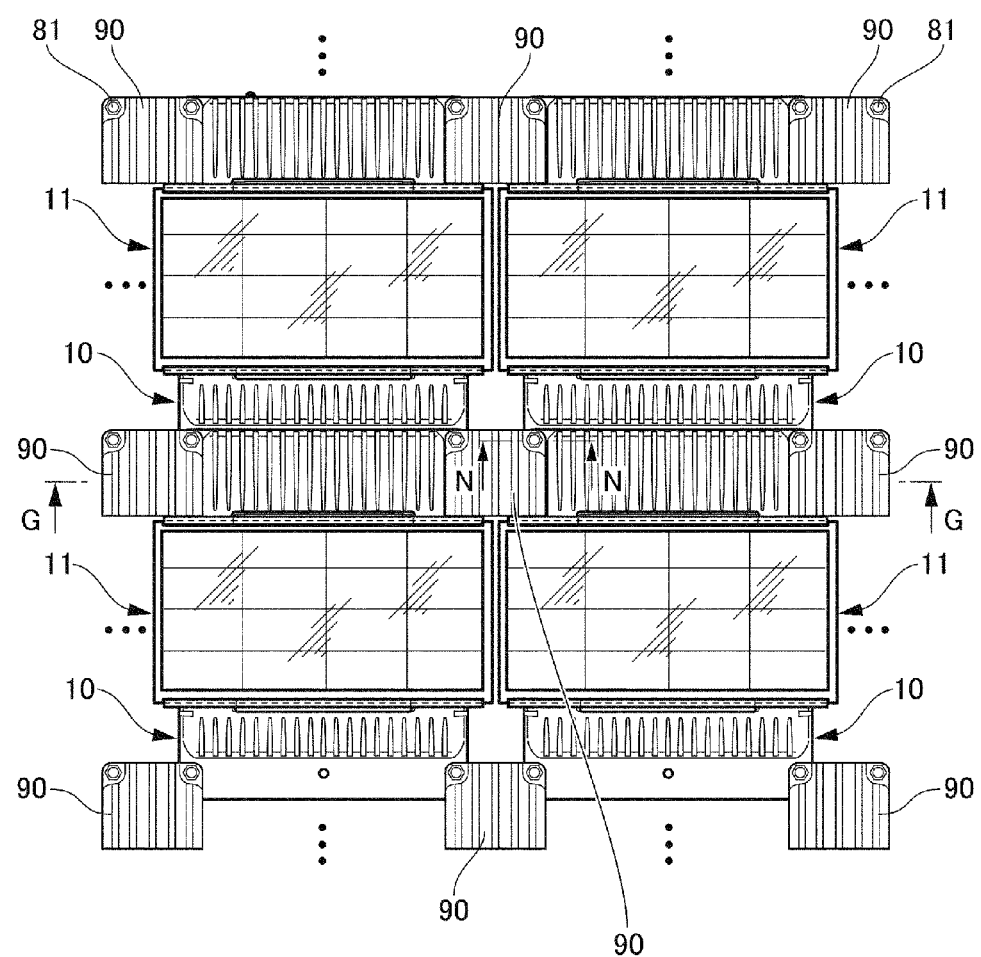
FIG. 3 is a plan view of a plurality of solar panels floats (solar panel float connected members) that are connected.

By arranging a plurality of solar panels floats 10 in the front-rear direction and the right-left direction on the water, a plurality of solar panels 11 can be installed closely (see FIG. 3). Two of the solar panel floats 10 that are adjacent to each other in the front-rear direction are fastened by means of female screw members 80 and male screw members 81. On the other hand, two of the solar panel floats 10 that are adjacent to each other in the right-left direction are connected via connector members 90 that are jointly fastened by means of the male screw members 81 and the female screw members 80. The solar panel floats 10 can be made to stay at certain locations on the water using anchors (not illustrated).

(Configuration of Annular Float Portion 30)

Figure 4:
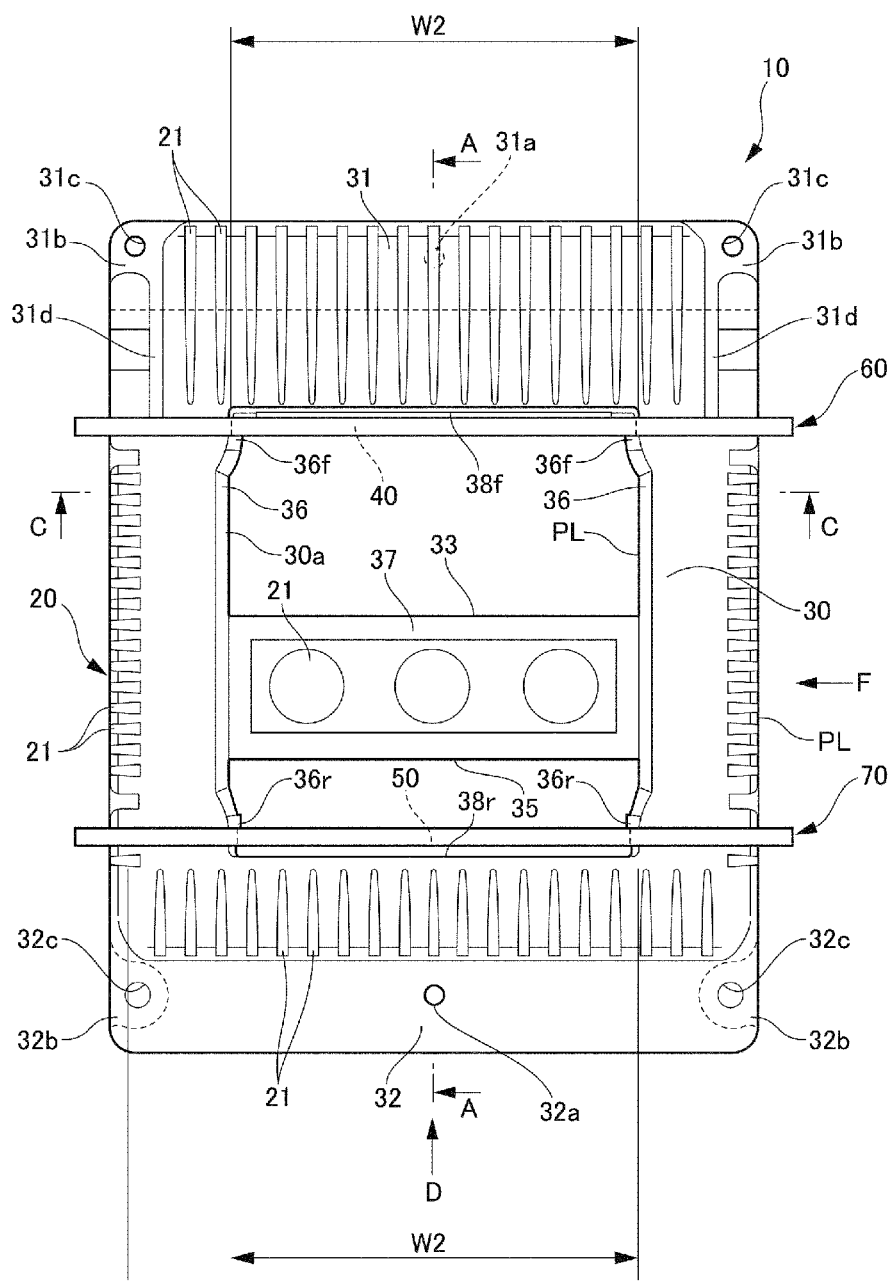
FIG. 4 is a plan view of a solar panel float.

The configuration of the annular float portion 30 will be described with reference to FIG. 4 and FIG. 5. As illustrated in FIG. 4, the annular float portion 30 is formed in a substantially quadrangular shape (in the present example, a substantially rectangular shape longer in the front-rear direction) as viewed in plan. In the annular float portion 30, along a front side portion and a rear side portion thereof, a front connector portion 31 and a rear connector portion 32 are integrally formed, respectively. The annular float portion 30 has an inner periphery 30a which includes a front opening portion 33 and a rear opening portion 35 that are arranged in the front-rear direction. Between the front opening portion 33 and the rear opening portion 35, a flat plate portion 37 connecting right and left side wall surfaces 36 is formed. The front opening portion 33 and the rear opening portion 35 are openings formed by cutting and raising the first support plate portion 40 and the second support plate portion 50, respectively.

Figure 5:
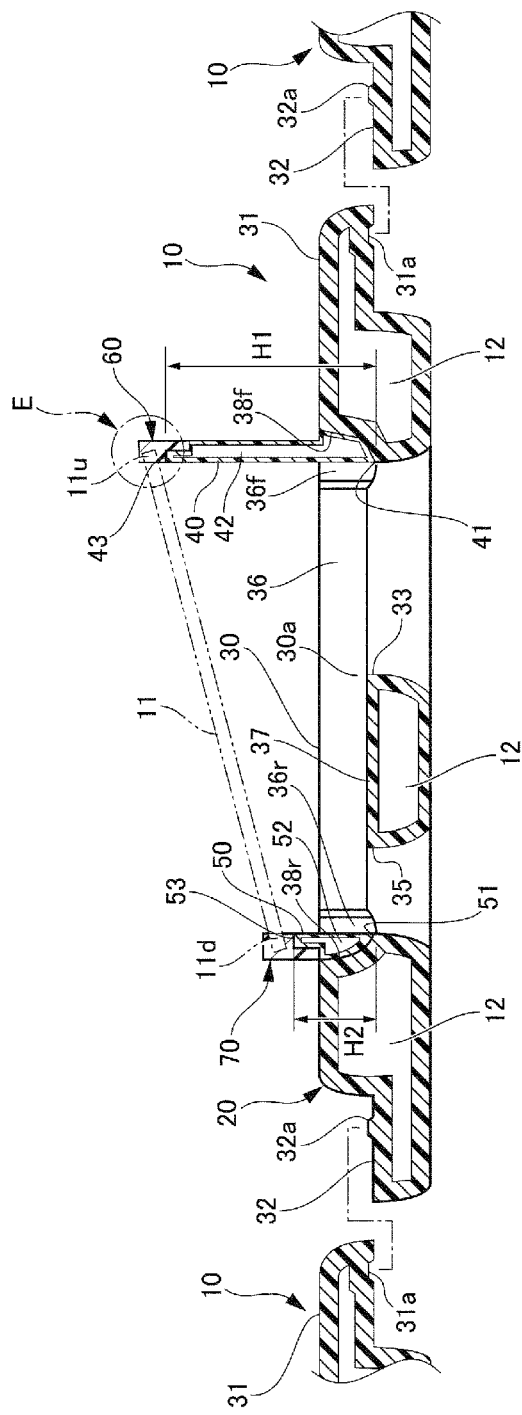
FIG. 5 is a cross sectional view taken along line A-A of FIG. 4.

As illustrated in FIG. 5, the front connector portion 31 is a thin plate portion eccentrically located on the upper side. The front connector portion 31 is formed so as to occupy approximately one half the basic thickness of the annular float portion 30. At substantially the center on the back surface of the front connector portion 31, a fitting opening 31a recessed on the upper side is formed.

Referring back to FIG. 4, the front connector portion 31 includes right and left front corner portions 31b which are compression-molded portions formed even thinner than the basic thickness of the front connector portion 31. The front corner portions 31b have front through holes 31c formed vertically penetrating therethrough. In addition, in the vicinity of the rear of the front through holes 31c, engaging recesses 31d for engaging the connector members 90 (see FIG. 2) are formed.

As illustrated in FIG. 5, the rear connector portion 32, which is a thin plate portion eccentrically located on the lower side, is formed so as to occupy approximately half the basic thickness of the annular float portion 30. At substantially the center on the upper surface of the rear connector portion 32, a protrusion 32a protruding on the upper side is formed. The protrusion 32a is fitted in the fitting opening 31a of another solar panel float 10 adjacently disposed on the front side. In this state, the rear connector portion 32 is overlapped on the lower side of the front connector portion 31 of another solar panel float 10.

Referring back to FIG. 4, the rear connector portion 32 includes right and left rear corner portions 32b which are compression-molded portions formed even thinner than the basic thickness of the rear connector portion 32. The rear corner portions 32b have rear through holes 32c formed vertically penetrating therethrough. To the rear through holes 32c, the female screw members 80 are attached.

At the front end portions of the right and left side wall surfaces 36, protruding front engaging portions 36f for retaining an upright state of the first support plate portion 40. At the rear end portions of the right and left side wall surfaces 36, protruding rear engaging portions 36r for retaining an upright state of the second support plate portion 50 are formed.

The float body 20 may be provided with reinforcing recessed ribs 21 at various parts thereof as needed. The recessed ribs 21 may have any desired form. For example, the form may be selected from various forms including a grooved or cylindrically (including a substantially cylindrical shape and a substantially truncated-conical shape) recessed form; and a form obtained by welding recessed tip-end faces of the opposing surfaces of the upper wall 13 and the lower wall 15.

(Configuration of the First Support Plate Portion 40 and the Second Support Plate Portion 50)

The configuration of the first support plate portion 40 and the second support plate portion 50 will be described with reference to FIG. 5.

As illustrated in FIG. 5, the first support plate portion 40 has a lower-side portion 41 integrally formed therewith on a front wall surface 38f of the front opening portion 33. Meanwhile, the first support plate portion 40 rises along the front wall surface 38f. The first support plate portion 40 has lateral-side portions 42 which are engaged with the front edges of front engaging portions 36f. By being sandwiched between the front engaging portions 36f and the front wall surface 38f, the upright state of the first support plate portion 40 is retained. In addition, the height H1 of the first support plate portion 40 is set to be greater than the height H2 of the second support plate portion 50. The first support plate portion 40 supports, at an upper portion 43 thereof, an upper-edge portion 11u of the solar panel 11 via a first mounting member 60.

The second support plate portion 50 has a lower-side portion 51 integrally formed therewith on a rear wall surface 38*r* of the rear opening portion 35. Meanwhile, the second support plate portion 50 rises along the rear wall surface 38*r*. The second support plate portion 50 includes lateral-side portions 52 which are engaged with rear edges of the rear engaging portions 36*r*. By being sandwiched between the rear engaging portions 36*r* and the rear wall surface 38*r*, an upright state of the second support plate portion 50 is retained. The second support plate portion 50 supports, at an upper portion 53 thereof, a lower-edge portion 11*d* of the solar panel 11 via a second mounting member 70. In the illustrated example, the first support plate portion 40 and the second support plate portion 50 have the same width W2 (see FIG. 4). However, the first support plate portion 40 and the second support plate portion 50 may be formed so as to have different widths from each other.

(Method for Assembling the First Support Plate Portion 40 and The Second Support Plate Portion 50)

A method for assembling the first support plate portion 40 and the second support plate portion 50 will be described with reference to FIGS. 6(*a*)-6(*b*).

The assembly method includes a step (A) of preparing a hollow molded body 20A of the float body 20; a cutting step (B) of partially cutting the hollow molded body 20A; and a bending step (C) of raising the portion cut.

In step (A), as illustrated in FIG. 6(*a*), the hollow molded body 20A is prepared. The hollow molded body 20A can be obtained, at the time of blow molding of the float body 20, by integrally forming a substantially quadrangular flat plate portion 22A with the inner periphery 30*a* of the annular float portion 30. The flat plate portion 22A is set on the parting line PL (see FIG. 2) of the inner periphery 30*a* so as to close the inner periphery 30*a*. In the flat plate portion 22A, annular crushed portions (indicated schematically by dot-dash lines) 23 corresponding to the outline of the first support plate portion 40 and the second support plate portion 50 are formed. The crushed portions 23 are portions formed by the welding and compression-molding of the upper wall 13 and the lower wall 15. The crushed portions 23 are formed to be thinner than the other portions.

In step (B), as illustrated in FIG. 6(*b*), three side portions of the crushed portions 23 are cut using a cutting blade or the like, leaving the portions corresponding to the lower-side portions 41 and 51 respectively of the first support plate portion 40 and the second support plate portion 50. By thus cutting the crushed portions 23, the contours of the above-described front opening portion 33, rear opening portion 35, and flat plate portion 37 (see FIG. 4) are formed.

In step (C), by causing the linear portions that are to provide the lower-side portions 41 and 51 to function as hinges, cut-and-raised pieces 25 and 26 are raised upward from the flat plate portion 22A, using the linear portions as bending-fulcrum points. Then, the first support plate portion 40 and the second support plate portion 50 including the cut-and-raised pieces 25 and 26 are further turned upward, and pressed onto the front wall surface 38*f* and the rear wall surface 38*r*, respectively. In this case, the lateral-side portions 42 of the first support plate portion 40, and the lateral-side portions 52 of the second support plate portion 50 are moved across the front engaging portions 36*f* and the rear engaging portions 36*r*, respectively. As a result, the upright state of the first support plate portion 40 and the second support plate portion 50 with respect to the annular float portion 30 is retained (temporarily fixed).

(Configuration of First Mounting Member 60)

Figure 7:
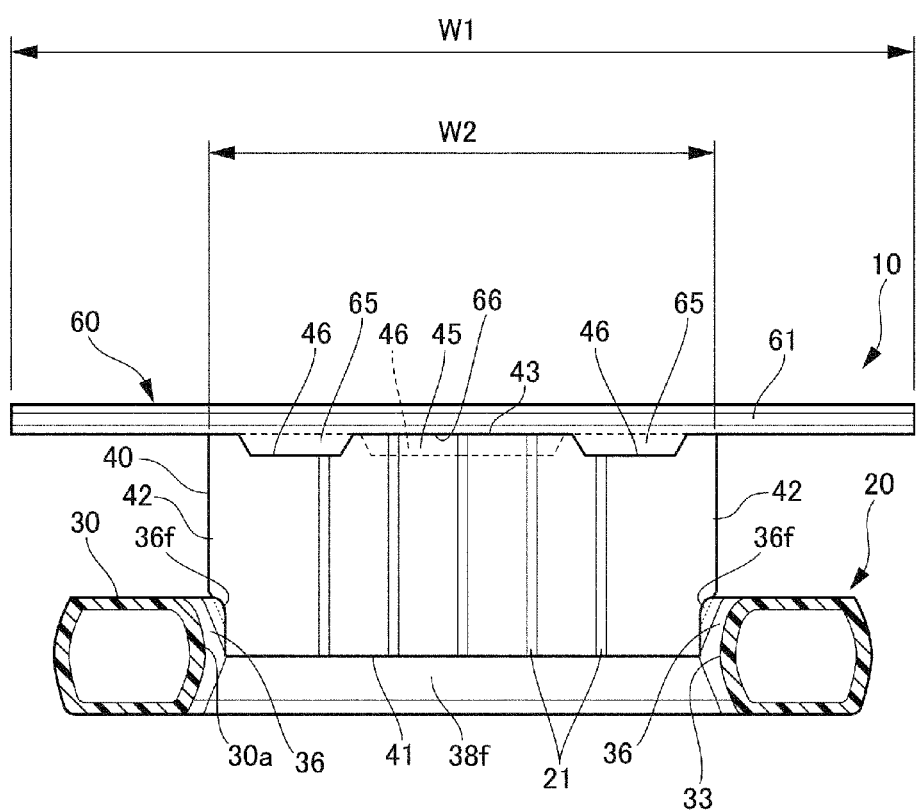
FIG. 7 is a cross sectional view taken along line C-C of FIG. 4.

The configuration of the first mounting member 60 will be described with reference to FIG. 7. As illustrated in FIG. 7, the first mounting member 60 is a member interposed between the upper portion 43 of the first support plate portion 40 and the upper-edge portion 11*u* of the solar panel 11 (see FIG. 2). The first mounting member 60 includes a fitting groove portion 61 extending in the right-left direction and opened on the rear side. Into the fitting groove portion 61, the upper-edge portion 11*u* of the solar panel 11 (see FIG. 2) can be fitted.

The width W1 of the first mounting member 60 is set to be greater than the width W2 of the upper portion 43 of the first support plate portion 40. In the present example, the width W1 of the first mounting member 60 is set to be approximately the same as, or slightly smaller than, the width WS of the upper-edge portion 11*u* of the solar panel 11 (see FIG. 2). As the material of the first mounting member 60, various materials may be used, such as synthetic resin.

On a front portion and a rear portion of the upper end of the first mounting member 60, protrusions 65 and a recess 66, respectively, are alternately formed in the right-left direction. The protrusions 65 on the front side and the recess 66 on the rear side are opposed to each other in the front-rear direction. On the other hand, in the upper portion 43 of the first support plate portion 40, a protrusion 45 and recesses 46 to be interlocked with the protrusions 65 and the recess 66 of the first mounting member 60 are formed. Thus, the protrusions 65 and the recess 66 can be interlocked with the protrusion 45 and the recesses 46. Accordingly, the first mounting member 60 is attached to the first support plate portion 40 in such a way as to sandwich the upper portion 43 of the first support plate portion 40 from the front and rear directions, and to prevent its own movement in the right-left direction. In addition, in the present example, the first mounting member 60 is attached such that its center position in the right-left direction is aligned with respect to the first support plate portion 40.

(Configuration of Second Mounting Member 70)

Figure 8:
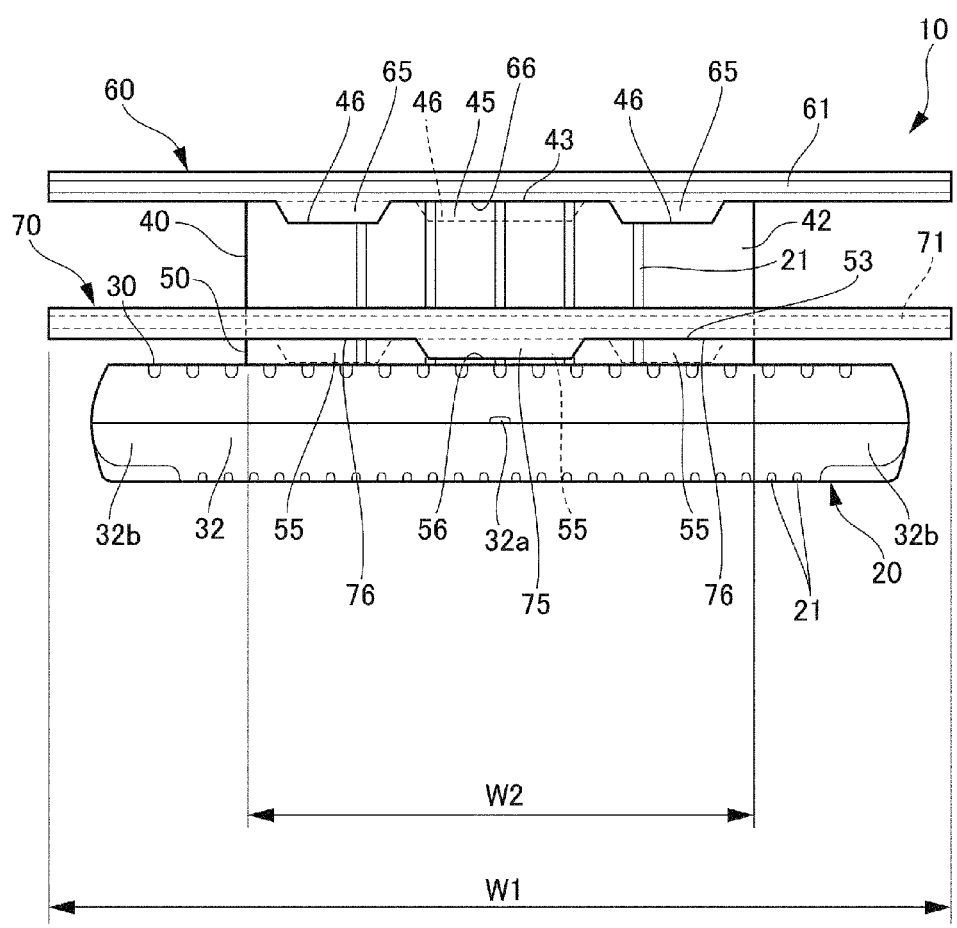
FIG. 8 is a front view of the solar panel float, viewed along arrow D of FIG. 4.

The configuration of the second mounting member 70 will be described with reference to FIG. 8. As illustrated in FIG. 8, the second mounting member 70 is a member interposed between the upper portion 53 of the second support plate portion 50 and the lower-edge portion 11*d* of the solar panel 11(see FIG. 2). The second mounting member 70 includes a fitting groove portion 71 extending in the right-left direction and opened on the front side. Into the fitting groove portion 71, the lower-edge portion 11*d* of the solar panel 11 (see FIG. 2) can be fitted.

The width W1 of the second mounting member 70 is set to be greater than the width W2 of the upper portion 53 of the second support plate portion 50. In the present example, the width W1 of the second mounting member 70 is set to be approximately the same as, or slightly smaller than, the width WS of the lower-edge portion 11*d* of the solar panel 11 (see FIG. 2). For the material of the second mounting member 70, various materials, such as synthetic resin, may be used. In the present example, the first mounting member 60 and the second mounting member 70 are formed to have the same width W1. However, the first mounting member 60 and the second mounting member 70 may be formed to have different widths.

On a front portion and a rear portion of the upper end of the second mounting member 70, a protrusion 75 and recesses 76, respectively, are alternately formed in the right-left direction. The protrusion 75 on the front side and the recesses 76 on the rear side are opposed to each other in the front-rear direction. On the other hand, on the upper portion 53 of the second support plate portion 50, protrusions 55 and a recess 56 to be interlocked with the protrusion 75 and the recesses 76 of the second mounting member 70 are formed. Thus, the protrusion 75 and the recesses 76 are interlocked with the protrusions 55 and recess 56. Accordingly, the second mounting member 70 is attached to the second support plate portion 50 in such a way as to sandwich the upper portion 53 of the second support plate portion 50 from the front and rear directions, and to prevent its own movement in the right-left direction. In addition, in the present example, the second mounting member 70 is attached with its center position in the right-left direction aligned with respect to the second support plate portion 50.

The first mounting member 60 and the second mounting member 70 may be formed in the same shape or different shapes. When formed in the same shape, the same components may be used for the first mounting member 60 and the second mounting member 70. Accordingly, the molds and the like can be shared, whereby the component cost of the first mounting member 60 and the second mounting member 70 can be reduced.

(Mount Structure for Solar Panel 11)

Figure 9:
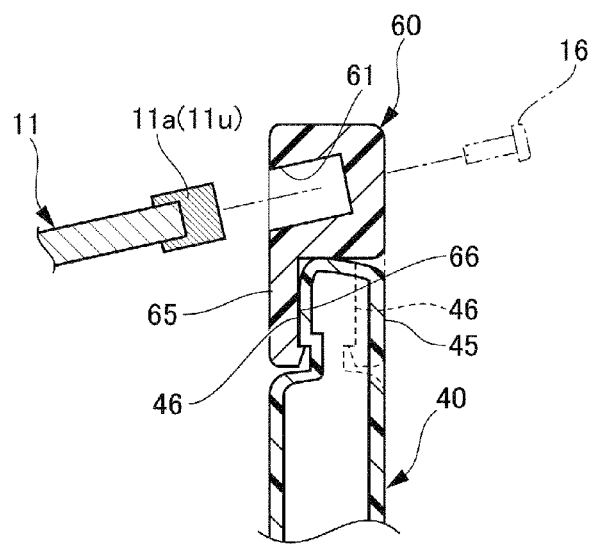
FIG. 9 is an enlarged view of portion E in FIG. 5.
Figure 10:
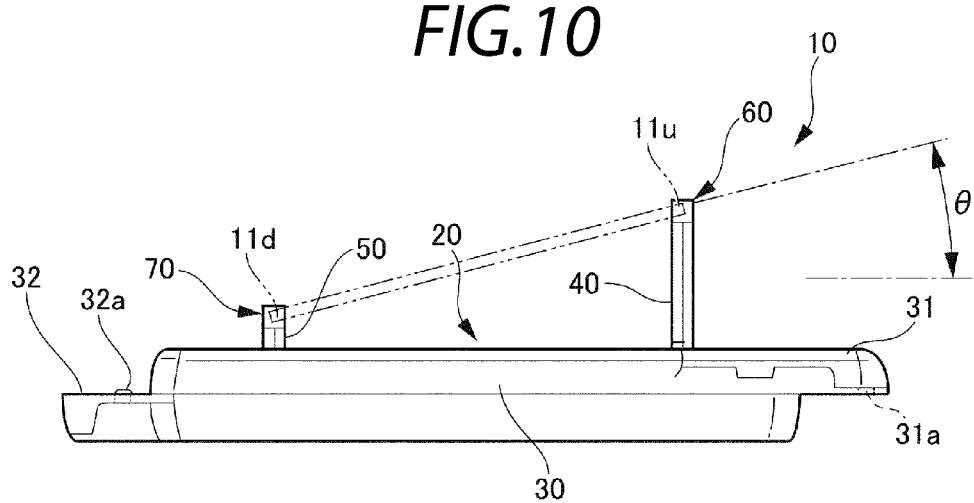
FIG. 10 is a side view of the solar panel float, viewed along arrow F in FIG. 4.

An example of the mount structure for the solar panel 11 will be described with reference to FIG. 9 and FIG. 10. As illustrated in FIG. 9, for example, the upper-edge portion 11u of the solar panel 11 is fitted by inserting a frame 11a (for example, an aluminum frame) portion disposed on the outer periphery of the solar panel 11 into the fitting groove portion 61, which may have a substantially U-shaped cross section, of the first mounting member 60. From the front side of the first mounting member 60, the frame 11a and the first mounting member 60 are fastened by means of a male screw member 16, such as bolts. The fitting groove portion 61 may be formed to be open toward the rear-bottom, in accordance with the inclination angle θ (see FIG. 10) of the solar panel 11.

FIG. 9 is an example of the mount structure for the first mounting member 60. The mount structure may similarly be applied to the fitting groove portion 71 of the second mounting member 70. In this case, for example, the fitting groove portion 71 with the substantially U-shaped cross section may be formed to be open toward the front-top.

(Configuration of Connector Member 90)

Figure 11:
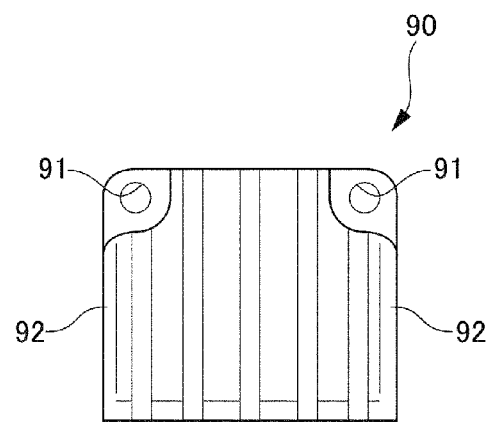
FIG. 11 is a plan view of a connector member according to the first example.

The configuration of the connector member 90 will be described with reference to FIG. 11 and FIG. 12. As illustrated in FIG. 11, the connector member 90 is a board-like member with a substantially quadrangular (in the present example, substantially square) shape as viewed in plan. In the right and left corners on the front side of the connector members 90, screw insertion openings 91 are formed. To the rear of the right and left screw insertion openings 91, bent portions 92 bent downward are formed. The material of the connector members 90 may be selected from various materials. However, from the viewpoint of weight and productivity, synthetic resin is preferable.

Figure 12:
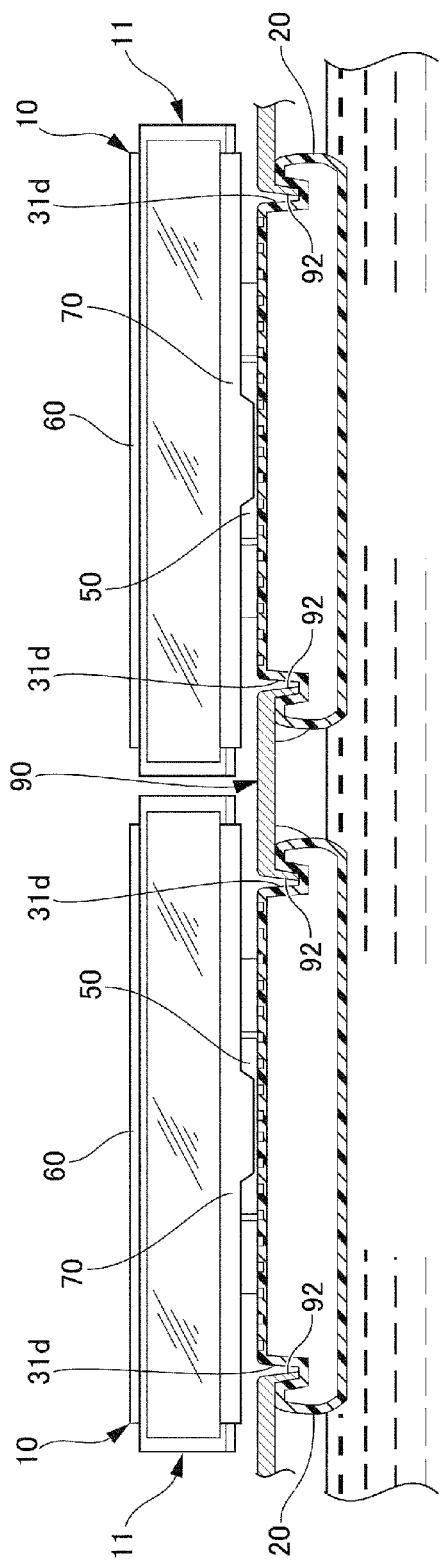
FIG. 12 is a cross sectional view taken along line G-G of FIG. 3.

As illustrated in FIG. 12, the connector member 90 is disposed so as to straddle between two solar panel floats 10 that are adjacent to each other in the right-left direction. The right and left bent portions 92 of the connector member 90 are fitted into the engaging recesses 31d from above. In addition, the connector member 90 is jointly fastened to the respective front corner portions 31b (see FIG. 4) of the two solar panel float 10, by means of the male screw members 81 (see FIG. 2) and the female screw members 80 (see FIG. 2) respectively inserted into the right and left screw insertion openings 91 (see FIG. 11). In this way, the two solar panel floats 10 adjacent to each other in the right-left direction can be strongly connected by means of the connector member 90. The connector member 90, as will be described later, is configured to be mounted on a passageway portion required for human installation or checking. In addition, two solar panel floats 10 which are adjacent to each other in the front-rear direction can be connected by means of the male screw members 81 (see FIG. 2), inserted into the rear through holes 32c and the front through holes 31c, and the female screw members 80 (see FIG. 2), with the front through holes (see FIG. 4) of the other solar panel float 10 adjacent to the rear being overlapped on the upper end of the rear through holes 32c (see FIG. 4). Between the screw insertion openings 91 (see FIG. 11) and the head of the male screw members 81 (see FIG. 2), bushing 93 (see FIG. 2) may be interposed.

Figure 16:
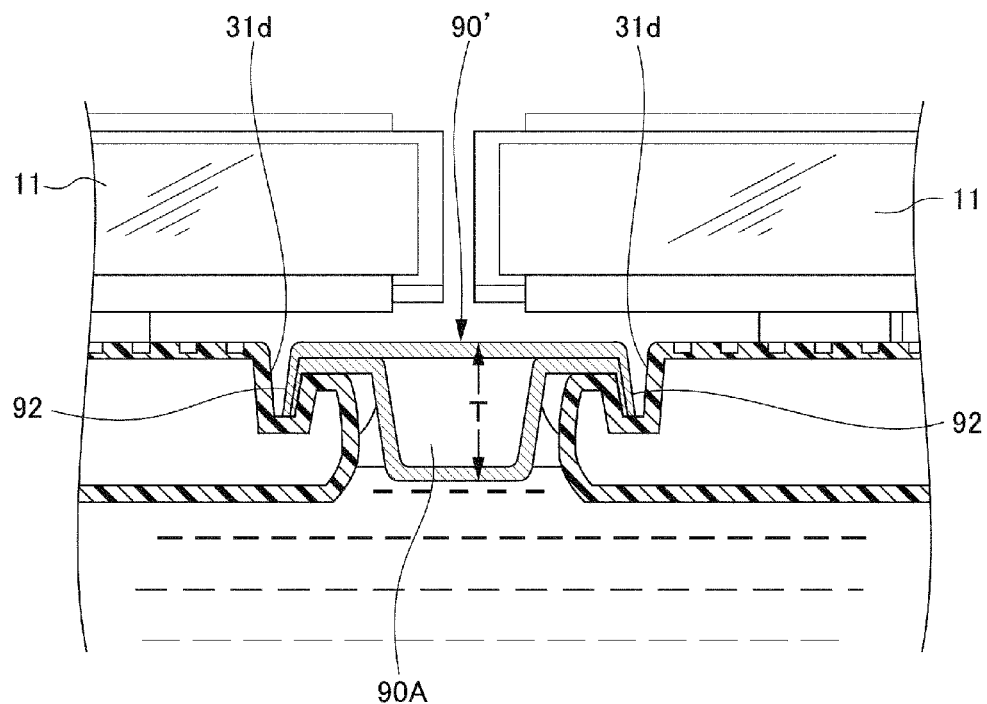
FIG. 16 is a cross sectional view illustrating a modification of a connector portion connecting a plurality of solar panels floats.
Figure 17:
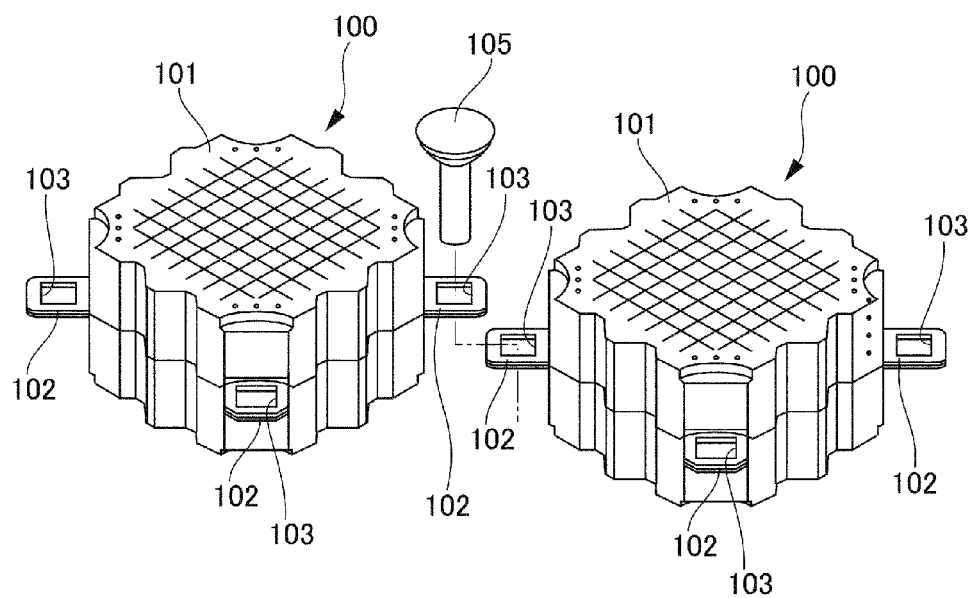
FIG. 17 is a perspective view of conventional floats.

FIG. 16 illustrates a modification of the connector member 90. FIG. 16 is drawn in a manner corresponding to FIG. 12. The connector member 90' illustrated in FIG. 16, compared with the case of FIG. 12, is configured to provide a float function by including a hollow portion 90A. The connector member 90' may be manufactured by blow molding whereby, for example, a molten tubular parison sandwiched between a plurality of split mold blocks is expanded.

That is, the connector member 90' is provided with the hollow portion 90A at the center portion apart from the peripheral bent portions 92 that are fitted in the engaging recesses 31d the adjacent two solar panel floats 10. When the solar panel float 10 is floated on the water, a part of the hollow portion 90A is immersed in water, together with the solar panel float 10. In this way, the hollow portion 90A is configured to receive buoyancy. Accordingly, the connector member 90 is formed with a thickness T such that at least a part of the connector member is immersed in water when the solar panel float 10 is floated on the water.

Thus, the solar panel floats 10 connected by the connector member 90' can be stably located on the water.

(Solar Panel Float Connected Member 80')

FIG. 3 is a plan view of a solar panel float connected members 80' formed by a plurality of the above-described solar panel floats 10 disposed adjacent to each other in the front-rear direction and the right-left direction. In this way, the solar panels 11 mounted on the respective solar panel floats 10 are disposed adjacent to each other via their short sides 11S, with a gap GP between their long sides 11L. In the gap GP between the long sides 11L of the solar panels 11, the front connector portion 31 of one solar panel float 10 and the rear connector portion 32 of the other solar panel float 10 that are arranged in the front-rear direction (the direction along of the short sides 11S of the solar panel 11) are exposed. This arrangement is due to the protrusions, in the front connector portion 31 and the rear connector portion 32, of the solar panel floats 10 extending beyond the long sides 11L of the solar panels 11.

In this case, as described above, the gap between the front connector portion 31 of one solar panel float 10 and the front connector portion 31 of the other solar panel float 10 which are arranged in the right-left direction (direction along the long sides 11L of the solar panel 11) are bridged by the connector members 90 functioning as a bridge board. Accordingly, the gap GP of the solar panels 11 on the respective solar panel floats 10 can be configured as the passageway portion on which a person can move freely in the right-left direction. Thus, installation and checking can be easily performed.

The solar panel float connected members 80' configured as described above provides the effect that, compared with a connected member such that the solar panels 11 are disposed with their long sides 11L aligned with the front-rear direction in the drawing, for example, the size of the solar panel floats 10 can be made an efficient size with respect to the solar panels 11. That is, if the solar panels 11 were to be disposed with their long sides 11L aligned with the front-rear direction in the drawing, the gap between the long sides 11L of the solar panels 11 would be a passageway portion. However, such passageway portion would have a narrow width. As a result, in order to avoid this, the width of each of the solar panel floats 10 in the right-left direction would have to be increased more than is necessary.

(Effect of First Example)

The effects of the first example will be described. According to the first example, the solar panel 11 can be supported by the first support plate portion 40 and the second support plate portion 50 which are integrally formed with the annular float portion 30. Accordingly, a float which is formed from a lightweight and tough hollow molded body, and which also has a solar panel 11 support function can be obtained in a single hollow molding (such as blow molding) procedure. Thus, an increase in the number of components can be prevented. In addition, the solar panel float 10 can be easily assembled by simply cutting and raising the first support plate portion 40 and the second support plate portion 50.

By setting the height H1 of the first support plate portion 40 to be greater than the height H2 of the second support plate portion 50, the solar panel 11 can be supported as inclined. In this way, the inclined solar panel 11 can be installed on the water.

By having the first support plate portion 40 and the second support plate portion 50 respectively engaged with the front engaging portions 36f and the rear engaging portions 36r, the first support plate portion 40 and the second support plate portion 50 can be temporarily fixed in the upright state until the solar panel 11 is mounted. In this way, the need for supporting the first support plate portion 40 and the second support plate portion 50 so as not to fall can be eliminated, whereby the assembly operation can be made even easier.

In addition, according to the first example, between the first support plate portion 40 and second support plate portion 50 and the solar panel 11, the first mounting member 60 and the second mounting member 70 are interposed. The width W1 of the first mounting member 60 and the second mounting member 70 is set to be greater than the width W2 of the first support plate portion 40 and the second support plate portion 50.

It is possible to mount the upper-edge portion 11u and the lower-edge portion 11d of the solar panel 11 to the upper portion 43 of the first support plate portion 40 and the upper portion 53 of the second support plate portion 50 directly without interposing the mounting members. However, in this case, in order to stably support the solar panel 11, the width W2 of the first support plate portion 40 and the second support plate portion 50 needs to be increased in accordance with the width WS of the upper-edge portion 11u and the lower-edge portion 11d of the solar panel 11. Meanwhile, the width of the annular float portion 30 is limited by the width of the solar panel 11 installed. Thus, it is difficult to increase the width of the annular float portion 30 more than is necessary. Accordingly, if a wide width is ensured for the width W2 of the first support plate portion 40 and the second support plate portion 50, the volume of the right and left side portions of the annular float portion 30 is that much necessarily decreased. As a result, the volume of the annular float portion 30 as a whole is decreased, whereby the buoyancy acting on the annular float portion 30 is decreased.

In this respect, according to the first example, by means of the first mounting member 60 and the second mounting member 70 extending in the right-left direction in accordance with the width WS of the solar panel 11, the upper-edge portion 11u and the lower-edge portion 11d of the solar panel 11 can be stably attached. Accordingly, the need to increase the width W2 of the first support plate portion 40 and the second support plate portion 50 in accordance with the width WS of the solar panel 11 is eliminated. Thus, a large width can be ensured for the right and left side portions of the annular float portion 30, increasing the buoyancy acting on the annular float portion 30. Accordingly, the solar panel 11 can be more stably installed on the water.

In addition, the first example has adopted the connection structure in which the female screw members 80 are assembled to the rear through holes 32c in advance by a fall-preventing portion 89. Accordingly, when the front connector portion 31 of the other solar panel float 10 is overlapped on the upper side of the rear connector portion 32 and fastened using the male screw members 81, the female screw members 80 are prevented from falling when the male screw members 81 are screwed into the female screw members 80. Accordingly, during the operation to connect a plurality of solar panels floats 10, there is no need to keep pushing the female screw members 80 on the back of the rear connector portion 32 when the male screw members 81 are screwed. Accordingly, the connection operation for a plurality of solar panels floats 10 can be simply performed even on the water.

The female screw members 80 including the fall-preventing portion 89 can be obtained by a simple configuration including a deforming portion 89b and a hook portion 89c formed in the deforming portion 89b.

In addition, when the male screw members 81 are screwed into the female screw members 80, rotation (so-called co-rotation) of the female screw members 80 can be prevented by the engagement of a rotation-preventing protrusion 86b and an engaging-groove portion 83. Accordingly, the connection operation for a plurality of solar panels floats 10 can be more simply performed.

When the solar panel floats 10 are configured as the solar panel float connected members 80', the size of each of the solar panel floats 10 can be made an efficient size with respect to the solar panel 11.

SECOND EXAMPLE

Figure 13A:
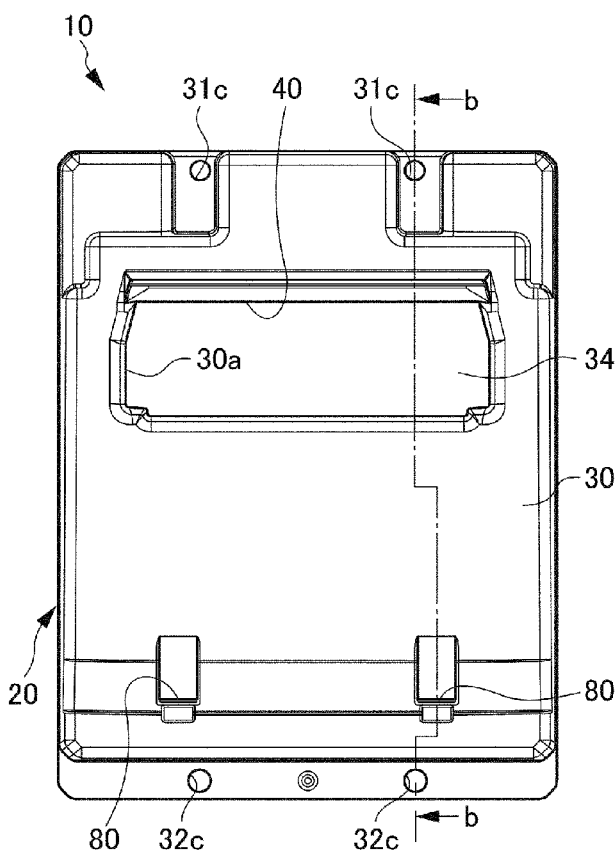
FIGS. 13(*a*)-13(*b*) show a configuration diagram of the solar panel float according to the second example of the present invention.
Figure 13B:
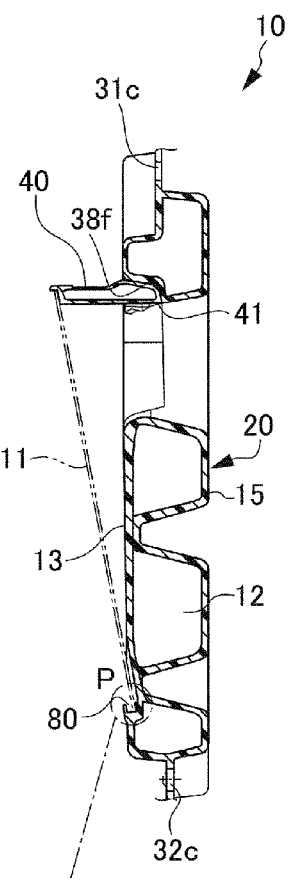
Figure 13C:
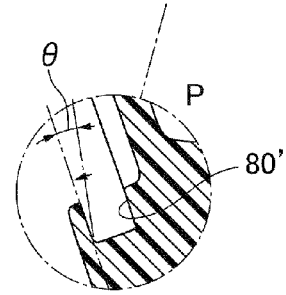

FIGS. 13(a)-13(c) show a configuration diagram illustrating the second example of the solar panel float according to the present invention. FIG. 13(a) is a plan view; FIG. 13(b) is a cross sectional view along line b - b of FIG. 13(a); and FIG. 13(c) is an enlarged view within the circular frame P of FIG. 13(b). FIG. 13(a) is drawn in a manner corresponding to FIG. 4. FIG. 13(b) is drawn in a manner corresponding to FIG. 5. Corresponding portions are denoted with similar signs.

In FIGS. 13(a) and 13(b), the difference is that the second support portion is not formed by the second support plate portion (denoted by sign 50 in FIG. 4 and FIG. 5), but by grooves 80" formed in the annular float portion 30. Thus, only the first support portion has a support plate portion (the first support plate portion 40) formed. The annular float portion 30 includes a single opening portion 34 as a reflection of the formation of the first support plate portion 40. The grooves 80" as the second support portion, as illustrated in FIG. 13(c), is formed in the upper wall 13 of the annular float portion 30 with an inclination of an angle θ with respect to the annular float portion 30, and with an opening facing the first support plate portion 40. Accordingly, as illustrated in FIG. 13(b), the edge on one side is supported by the first support plate portion 40 with the other edge being locked in the grooves 80" as the second support portion, the solar panel 11 can be disposed at an inclination of the angle θ with respect to the annular float portion 30.

The solar panel float 10 configured as described above can provide similar effects to those of the solar panel float 10 according to the first example, in spite of a simple configuration. The second example has been described focusing on portions that are greatly different compared with the first example. Accordingly, the reinforcing recessed ribs 21, the first mounting member 60 and the like, described with reference to the first example, may of course be mounted as needed.

THIRD EXAMPLE

Figure 14:
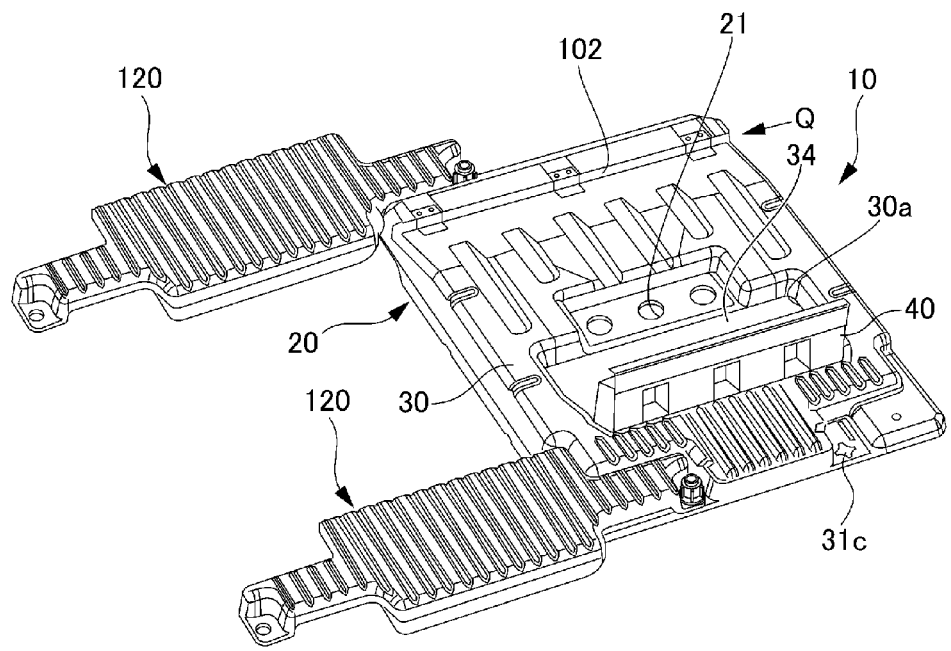
FIG. 14 is a perspective view of the solar panel float according to the third example of the present invention.
Figure 15:
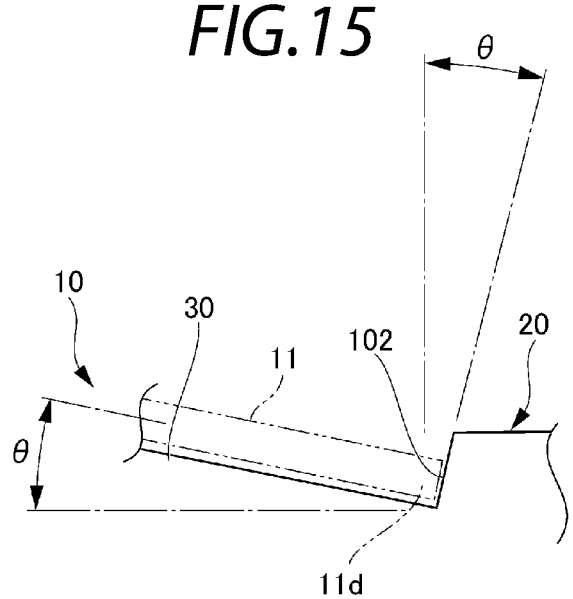
FIG. 15 is a view along arrow Q of FIG. 14.

FIG. 14 is a perspective view of the third example of the solar panel float according to the present invention. FIG. 15 is a view along arrow Q of FIG. 14.

As illustrated in FIG. 14, in the third example, the second support portion is not formed by the second support plate portion (indicated at sign 50 in FIG. 4 and FIG. 5), and the second support portion is formed by a step portion 102 formed in the annular float portion 30. Thus, in this case, too, as in the second example described above, the support plate portion (the first support plate portion 40) is formed only in the first support portion. The annular float portion 30 includes a single opening portion 34 as a reflection of the formation of first support plate portion 40.

As illustrated in FIG. 15, the step portion 102 as the second support portion is formed so as to have an inclination angle θ with respect to the vertical direction, and to oppose the first support plate portion 40 (see FIG. 14). Accordingly, the solar panel 11, by having a first edge thereof being supported by the first support plate portion 40 (see FIG. 14) and a second edge thereof (lower-edge portion 11d) being locked on the step portion 102 as the second support portion, can be disposed at the inclination angle θ with respect to the annular float portion 30.

In the third example too, similar effects to those of the solar panel float 10 according to the first example can be obtained in spite of a simple configuration.

The present invention has been described with reference to the examples. However, it is to be noted that the technical scope of the present invention is not limited to the scope of the examples described. It should be obvious to those skilled in the art that various modifications or improvements may be made in the examples. It will be obvious from the claims set forth below that the technical scope of the present invention includes examples incorporating such modifications or improvements.

The invention claimed is:

1. A solar panel float connected member comprising:
   a plurality of rectangular solar panels floats mutually connected adjacent to each other; and
   a rectangular solar panel mounted on each of the floats and having transverse sides and sides shorter than the transverse sides, wherein
   the solar panels are disposed adjacent to each other via the sides shorter than the transverse sides and adjacent to each other having a gap via the transverse sides thereof, and
   the gap of the solar panels on the floats is formed as a passageway portion.

2. The solar panel float connected member according to claim 1, wherein the passageway portion is formed as a protrusion extending beyond at least one of the transverse sides of the solar panels of the floats.

3. The solar panel float connected member according to claim 1, wherein the floats are connected to other floats on the sides shorter than the transverse sides of the solar panel via a connector member over the passageway portion.

4. The solar panel float connected member according to claim 3, wherein the connector member includes a hollow portion.

5. The solar panel float connected member according to claim 3, wherein the connector member has a thickness such that at least a part of the connector member is submerged when the float is floated on water.

6. The solar panel float connected member according to claim 4, wherein the connector member has a thickness such that at least a part of the connector member is submerged when the float is floated on water.

* * * * *